United States Patent
Park et al.

(10) Patent No.: US 12,284,396 B2
(45) Date of Patent: Apr. 22, 2025

(54) SYSTEMS AND METHODS FOR MOTION COMPENSATED TEMPORAL FILTERING DURING IMAGE PROCESSING OPERATIONS

(71) Applicant: Apple Inc., Cupertino, CA (US)

(72) Inventors: Jae Young Park, Los Gatos, CA (US); Jaehong Chon, San Diego, CA (US); Jim C Chou, San Jose, CA (US); Athanasios Leontaris, Cupertino, CA (US)

(73) Assignee: Apple Inc., Cupertino, CA (US)

(*) Notice: Subject to any disclaimer, the term of this patent is extended or adjusted under 35 U.S.C. 154(b) by 93 days.

(21) Appl. No.: 18/101,571

(22) Filed: Jan. 25, 2023

(65) Prior Publication Data

US 2024/0080498 A1 Mar. 7, 2024

Related U.S. Application Data

(60) Provisional application No. 63/404,102, filed on Sep. 6, 2022.

(51) Int. Cl.
*H04N 19/86* (2014.01)
*H04N 19/436* (2014.01)
*H04N 19/513* (2014.01)
*H04N 19/52* (2014.01)
*H04N 19/53* (2014.01)

(52) U.S. Cl.
CPC ........... *H04N 19/86* (2014.11); *H04N 19/436* (2014.11); *H04N 19/52* (2014.11); *H04N 19/521* (2014.11); *H04N 19/53* (2014.11)

(58) Field of Classification Search
CPC .... H04N 19/436; H04N 19/52; H04N 19/521; H04N 19/523; H04N 19/53; H04N 19/86
See application file for complete search history.

(56) References Cited

U.S. PATENT DOCUMENTS

| | | |
|---|---|---|
| 9,106,888 B2 | 8/2015 | Chou |
| 9,215,472 B2 | 12/2015 | Orr et al. |
| 9,218,639 B2 | 12/2015 | Cote et al. |
| 9,224,186 B2 | 12/2015 | Rygh et al. |
| 9,224,187 B2 | 12/2015 | Cote et al. |
| 9,270,999 B2 | 2/2016 | Cote et al. |
| 9,292,899 B2 | 3/2016 | Schaub et al. |
| 9,299,122 B2 | 3/2016 | Okruhlica et al. |

(Continued)

OTHER PUBLICATIONS

International Search Report and Written Opinion for PCT Application No. PCT/US2023/032029 dated Dec. 21, 2023; 11 pgs.

*Primary Examiner* — Mohammed S Rahaman
(74) *Attorney, Agent, or Firm* — Fletcher Yoder, P.C.

(57) ABSTRACT

The present disclosure is directed towards image processing circuitry that applies temporal filtering to video image data along motion trajectories in the video image data. The temporal filtering may be applied along motion trajectories in the image data, by filtering source pixels by reference pixel values and the refined motion vectors. The temporal filtering circuitry may fetch source and reference pixel values based on received motion vectors from an encoding pipeline. Additionally, the temporal filtering circuitry may include a motion vector refinement block along with a temporal filtering block, such that the video image data may be filtered based on refined motion vectors and source and reference pixel values.

20 Claims, 10 Drawing Sheets

(56) References Cited

U.S. PATENT DOCUMENTS

| | | | |
|---|---|---|---|
| 9,305,325 B2 | 4/2016 | Cheng et al. | |
| 9,336,558 B2 | 5/2016 | Cote et al. | |
| 9,351,003 B2 | 5/2016 | Cote et al. | |
| 9,380,312 B2 | 6/2016 | Cote et al. | |
| 10,134,110 B1 | 11/2018 | Liu et al. | |
| 10,735,769 B2 | 8/2020 | Levy et al. | |
| 10,832,379 B1 | 11/2020 | Liu et al. | |
| 2004/0252759 A1* | 12/2004 | John Winder | H04N 19/87 |
| | | | 375/E7.251 |
| 2012/0075535 A1* | 3/2012 | Van Beek | H04N 5/145 |
| | | | 348/E5.062 |
| 2015/0092833 A1 | 4/2015 | Ku et al. | |
| 2015/0092843 A1 | 4/2015 | Millet et al. | |
| 2015/0092855 A1 | 4/2015 | Chou et al. | |
| 2016/0007038 A1 | 1/2016 | Chou et al. | |
| 2016/0021385 A1 | 1/2016 | Chou et al. | |
| 2016/0065969 A1 | 3/2016 | Cheng et al. | |
| 2016/0065973 A1 | 3/2016 | Cote et al. | |
| 2018/0045223 A1 | 2/2018 | Bailey | |
| 2018/0343448 A1* | 11/2018 | Possos | H04N 19/176 |
| 2019/0045223 A1* | 2/2019 | Levy | H04N 19/137 |
| 2019/0215518 A1* | 7/2019 | Alagappan | H04N 19/53 |
| 2020/0021842 A1* | 1/2020 | Leontaris | H04N 19/527 |
| 2021/0248757 A1 | 8/2021 | Spampinato et al. | |
| 2022/0030266 A1* | 1/2022 | Park | H04N 19/157 |
| 2022/0279198 A1 | 9/2022 | Du et al. | |

\* cited by examiner

SYSTEMS AND METHODS FOR MOTION COMPENSATED TEMPORAL FILTERING DURING IMAGE PROCESSING OPERATIONS

CROSS-REFERENCE TO RELATED APPLICATIONS

This application claims priority to U.S. Provisional Application No. 63/404,102, entitled "SYSTEMS AND METHODS FOR MOTION COMPENSATED TEMPORAL FILTERING DURING IMAGE PROCESSING OPERATIONS," filed Sep. 6, 2022, the disclosure of which is incorporated herein in its entirety for all purposes.

BACKGROUND

The present disclosure generally relates to image processing, and, more particularly, to video encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information, for example, as text, still images, and/or video based on corresponding image data. The image data may include video images that include motion. The video images may be encoded using video encoder circuitry using motion trajectories and image pixel data.

To facilitate encoding, prediction techniques may be used to indicate the image data by referencing other image data. For example, since successively displayed images (e.g., image frames) may be generally similar, inter (e.g., interframe) prediction techniques may be used to indicate image data (e.g., a prediction unit) corresponding with a first image frame by referencing image data (e.g., a reference sample) corresponding with a second image frame, which may be displayed before or after the first image frame. To facilitate identifying the reference sample, a motion vector may indicate position of a reference sample in the second image frame relative to position of a prediction unit in the first image frame. In other words, instead of directly compressing the image data, the image data may be encoded based on a motion vector used to indicate desired value of the image data.

In some instances, the encoding process may apply filters to image data to produce images or sequences of images that appear smoother and include fewer visible image artifacts discernable by the human eye. However, when the video image data includes motion, filters that may filter the video image data may introduce image artifacts. This may result in video images output with a lower image quality than the original video images.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to processing techniques that may be utilized when performing image processing. For example, the techniques described herein may be utilized as part of a process for filtering encoded image data. In particular, the techniques described herein relate to motion compensated temporal filtering, more specifically to apply temporal filtering along motion trajectories corresponding to video image data. Motion compensated temporal filtering circuitry may include multiple hardware components, and may receive motion vectors corresponding to video image data from one or more encoding pipelines (e.g., a full-resolution encoding pipeline, a low-resolution encoding pipeline). The motion compensated temporal filtering circuitry may include a source and reference fetch block that may fetch source and reference pixels corresponding to received motion vectors. The fetch block may send the fetched source and reference pixels to motion vector refinement circuitry and a temporal filter block. The source and reference fetch block may receive motion vectors corresponding to video image data and fetch pixels within a coding tree unit (CTU) of the video image data, along with additional pixels surrounding the CTU. The source and reference fetch block may fetch reference luma pixel values and reference chroma pixel values based on a set pixel refinement value.

A motion vector refinement block of the motion compensated temporal filtering circuitry may receive the fetched source pixel values and reference pixel values, in addition to the initial motion vectors received from encoder circuitry. The motion vector refinement block may refine the motion vectors around a specified window value in sub-pel precision. For each source pixel block received from the source and reference fetch block, multiple motion vectors may be considered based on the pixel size of the pixel block. The cost for each of the motion vectors for each pixel block may be calculated based on differences between source and reference pixels and may be based on neighbor motion vector values. The motion vectors that result in the lowest cost may be selected as refined motion vectors. The refined motion vectors may be sent to a temporal filter block so that filtering operations may be performed.

Once the temporal filtering block has received the refined motion vectors from the motion vector refinement block, the temporal filtering block filters each source pixel value with the corresponding reference pixel value determined by the refined motion vectors received from the motion vector refinement block. The filtering may be conducted on a pixel-by-pixel basis. The luma and chroma reference pixel values may be received from the source and reference fetch block and the refined motion vectors may be received from the motion vector refinement block. The temporal filtering block may utilize lookup tables (LUTs) to replace inverse computations for pixel difference, motion vector difference, and frame weights. The filtering operation performed on each of the pixels may be a weighted combination of the source and reference pixel values. The resulting filtered pixel values may then be output along with the refined motion vectors and/or a subset of the refined motion vectors. The outputs of the temporal filter block may be directed back onto the motion compensated temporal filtering circuitry to be used as neighbor pixel values in further motion compensated temporal filtering operations.

BRIEF DESCRIPTION OF THE DRAWINGS

Various aspects of this disclosure may be better understood upon reading the following detailed description and upon reference to the drawings in which.

DETAILED DESCRIPTION

Figure 1:
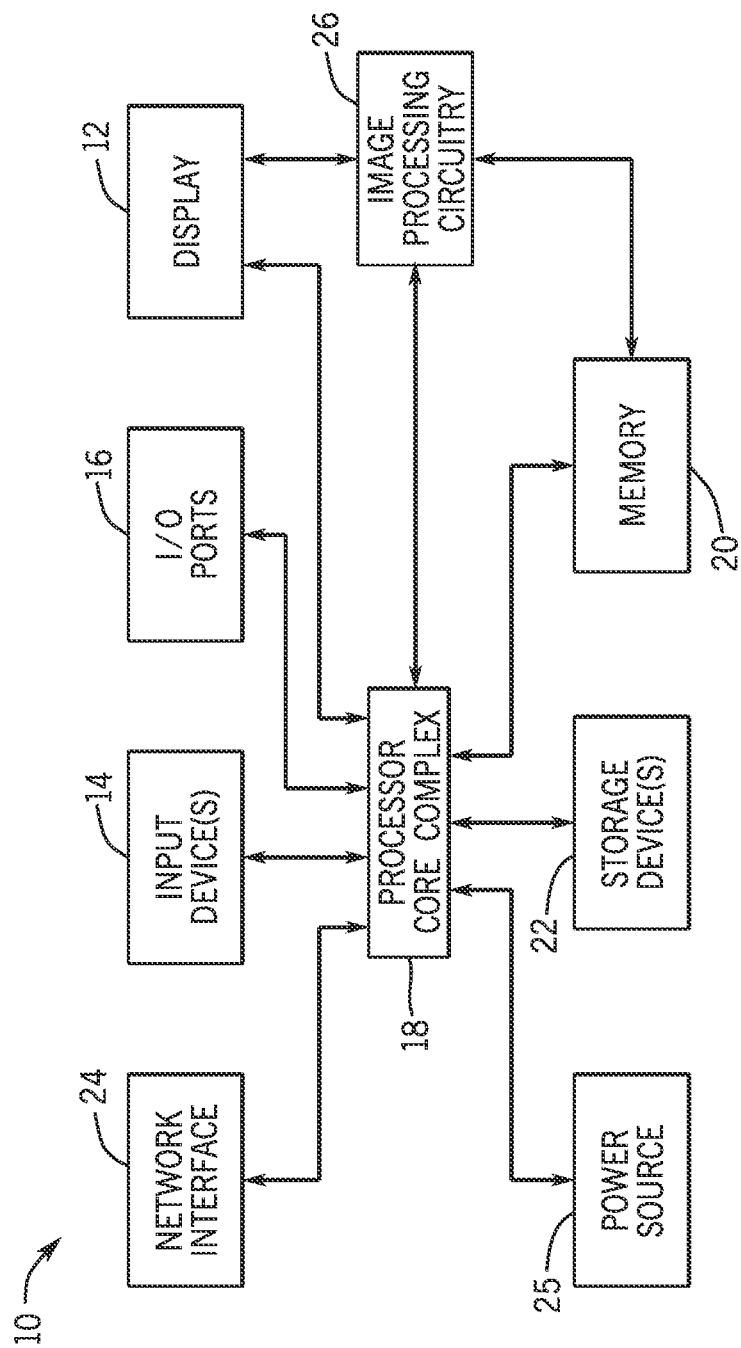
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An electronic device may display images based on frames of image data. In some embodiments, the image data may be generated by an image sensor (e.g., digital camera) and stored in the electronic device. Additionally, when the video data is generated external from the electronic display, the video data may be transmitted to the electronic device. To reduce resource usage, image data may be encoded (e.g., compressed) to reduce size (e.g., number of bits) which, for example, may reduce transmission bandwidth and/or memory address usage. The encoded image data may undergo one or more filtering operations to remove image artifacts, but filtering operations may not always consider motion vectors that are used for video image encoding.

To improve filtering operations of received video data, the image processing circuitry of the electronic device may include motion compensated temporal filtering circuitry that enables filtering the video data along motion trajectories. The motion compensated temporal filtering circuitry may include multiple components and may receive motion vectors corresponding to video image data from one or more encoding pipelines (e.g., a full-resolution encoding pipeline, a low-resolution encoding pipeline). The motion compensated temporal filtering circuitry may include a source and reference fetch block that may fetch source and reference pixels corresponding to the motion vectors. The source and reference fetch block may send the fetched source and reference pixels to a motion vector refinement circuitry and temporal filter block. The source and reference fetch block may receive motion vectors corresponding to video image data and fetch pixels within a coding tree unit (CTU) of the video image data, along with additional pixels surrounding the CTU. Additionally, the source and reference fetch block may fetch reference luma pixel values and reference chroma pixel values based on a set pixel refinement value.

The motion vector refinement block of the motion compensated temporal filtering circuitry may receive the fetched source pixel values and reference pixel values, in addition to the initial motion vectors received from encoder circuitry. The motion vector refinement block may refine the motion vectors around a specified window value in sub-pel precision. For each source pixel block received from the source and reference fetch block, multiple motion vectors may be considered based on the pixel size of the pixel block. A computation may be performed to determine a cost value for each of the motion vectors for each pixel block. The cost computation may be calculated based on differences between source and reference pixels, and based on neighbor motion vector values. The motion vectors that result in the lowest cost value are selected by the motion vector refinement block as the refined motion vectors. The refined motion vectors are sent to the temporal filter block so that filtering operations on motion vectors may be performed, and output and/or redirected back into the motion compensation temporal filtering circuitry.

Once the temporal filtering block has received the refined motion vectors from the motion vector refinement block, the temporal filtering block filters each source pixel value with the corresponding reference pixel value determined by the refined motion vectors received from the motion vector refinement block. The filtering may be conducted on a pixel-by-pixel basis. The luma and chroma reference pixel values may be received from the source and reference fetch block and the refined motion vectors may be received from the motion vector refinement block. The temporal filtering block may utilize lookup tables (LUTs) to replace inverse computations for pixel difference, motion vector difference, and frame weights. The filtering operation performed on each of the pixels may be a weighted combination of the source and reference pixel values. The resulting filtered pixel values may then be output along with the refined motion vectors and/or a subset of the refined motion vectors. The outputs of the temporal filter block may be directed back onto the motion compensated temporal filtering circuitry to be used as neighbor pixel values in further motion compensated temporal filtering operations.

With this in mind, an example of an electronic device 10 that may benefit from these features is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to an electronic display 12, the electronic device 10 includes one or more input devices 14, one or more input/output (I/O) ports 16, a processor core complex 18 having one or more processors or processor cores and/or image processing circuitry 26, memory 20, one or more storage devices 22, a network interface 24, and image processing circuitry 26. The various components described in FIG. 1 may include hardware elements (e.g., circuitry), software elements (e.g., a tangible, non-transitory computer-readable medium storing instructions), or a combination of both hardware and software elements. The various components may be combined into fewer components or separated into additional components. For example, the memory 20 and the storage devices 22 may be included in a single component. In another example, the image processing circuitry 26 may be a component of the processor core complex 18, a separate module, or a component of the electronic display 12.

The processor core complex 18 is operably coupled with the memory 20 and the storage device 22. As such, the processor core complex 18 may execute instructions stored in memory 20 and/or a storage device 22 to perform operations, such as generating or processing video data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as video data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., video data) to a communication network and/or receive data from the communication network.

A power source 25 may provide electrical power to operate the processor core complex 18 and/or other components in the electronic device 10, for example, via one or more power supply rails. Thus, the power source 25 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as video data, with the portable storage device. The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may display images. For example, the electronic display 12 may display a graphical user interface (GUI) 32 of an operating system, an application interface, text, a still image, or video content. The electronic display 12 may display an image by controlling the luminance of various display pixels based at least in part image data associated with corresponding image pixels in image data. The image data may be generated by an image source, such as the processor core complex 18, a graphics processing unit (GPU), an image sensor, and/or memory 20 or storage 22. Image data may also be received from another electronic device 10 via the network interface 24 and/or an I/O port 16.

Figure 2:
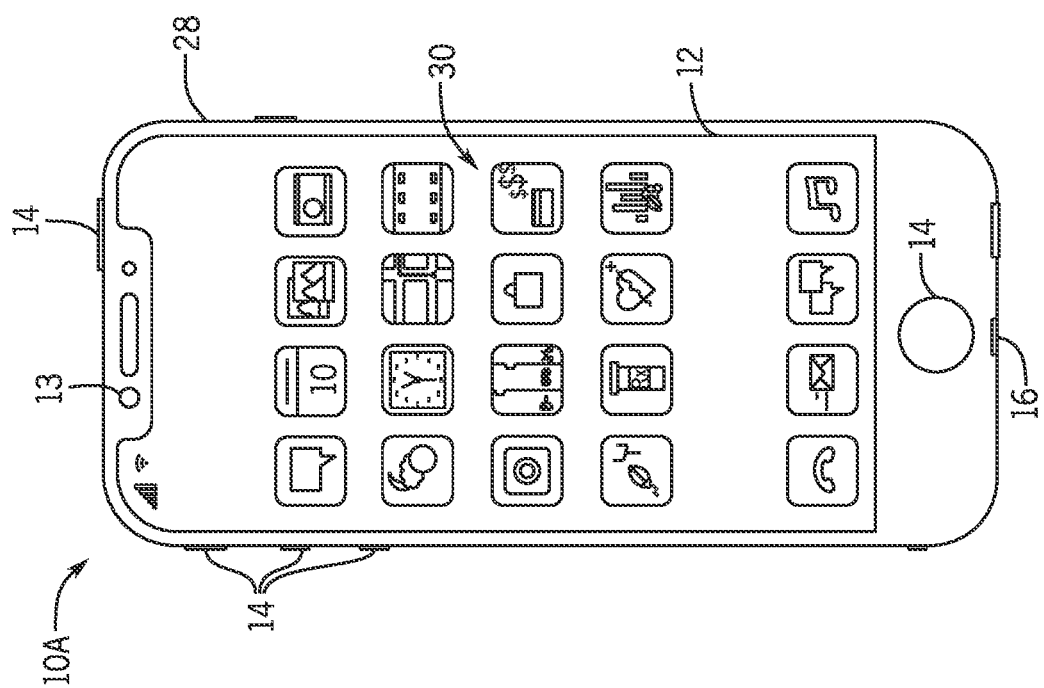
FIG. 2 is an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) having an array of icons. By way of example, when an icon is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
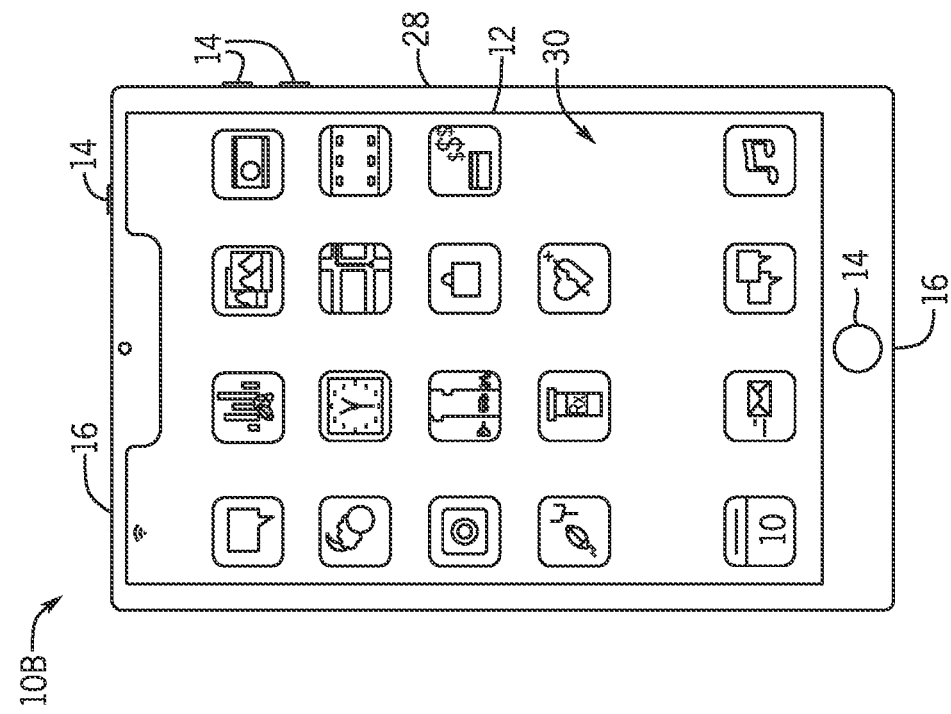
FIG. 3 is another example of the electronic device of FIG. 1, in accordance with an embodiment.
Figure 4:
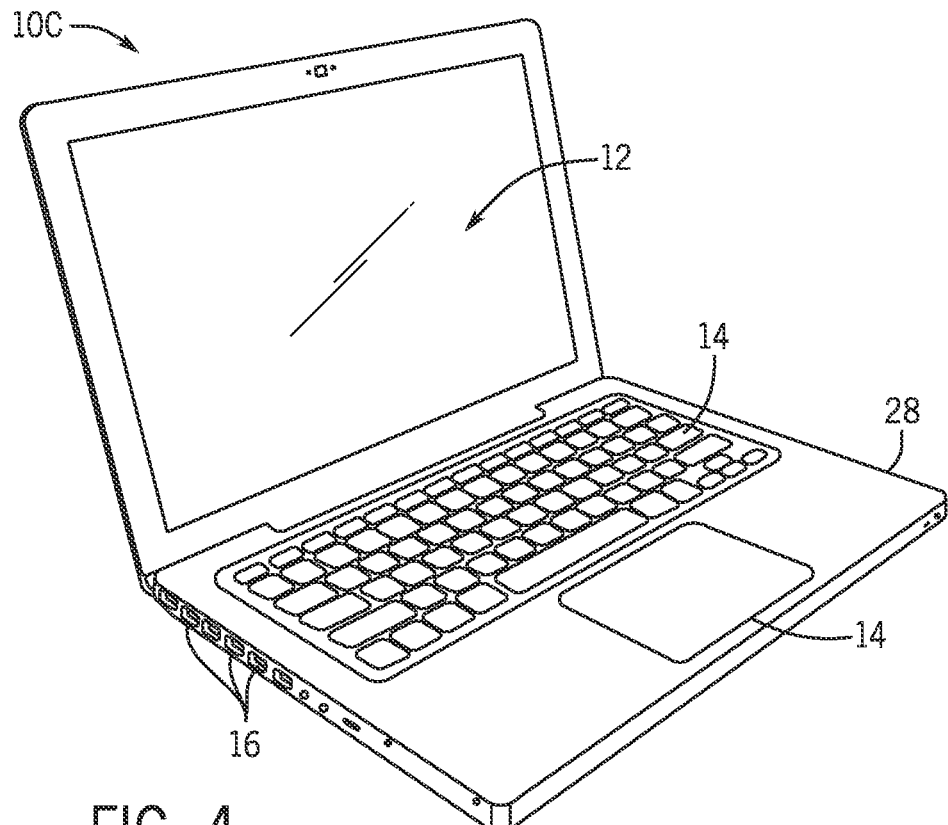
FIG. 4 is another example of the electronic device of FIG. 1, in accordance with an embodiment.
Figure 5:
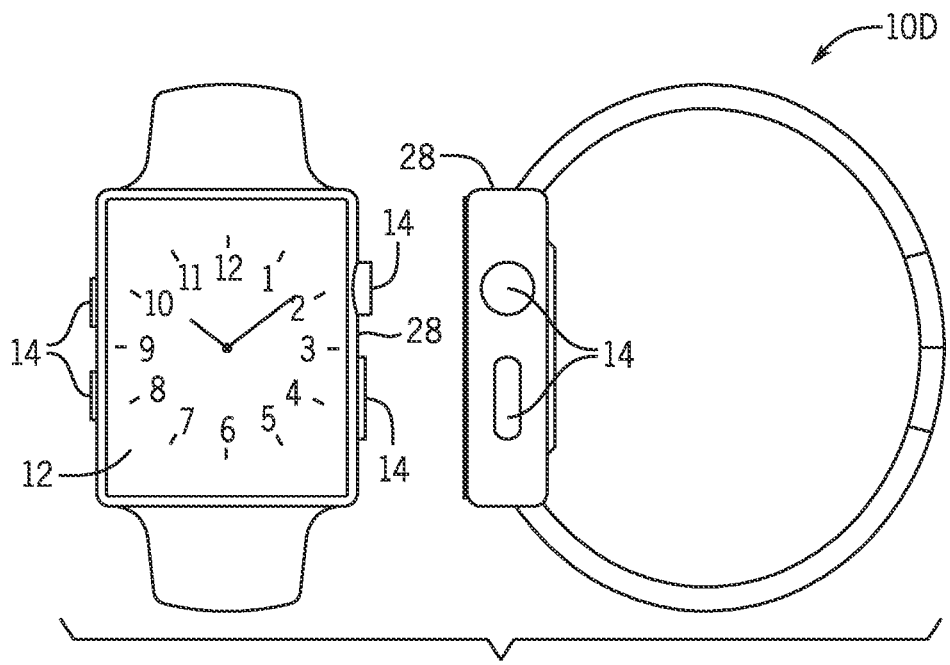
FIG. 5 is another example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

Figure 6:
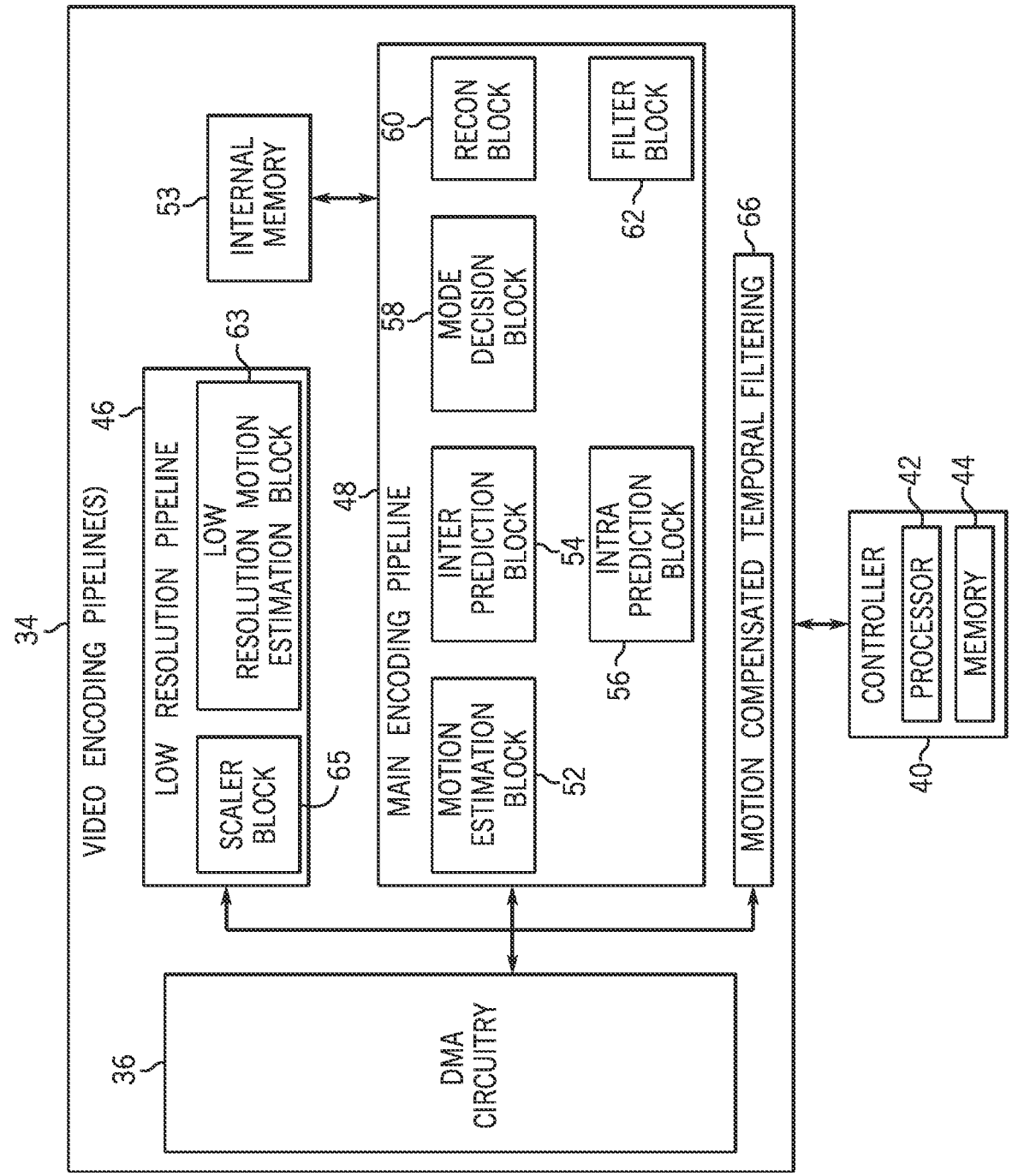
FIG. 6 is block diagram of a portion of the electronic device of FIG. 1 including a video encoding system, in accordance with an embodiment.

An example of a portion of an electronic device 10, which includes encoder circuitry 34, is shown in FIG. 6. The encoder circuitry 34 may be implemented via circuitry, for example, packaged as a system-on-chip (SoC). Additionally, or alternatively, the encoder circuitry 34 may be included in the processor core complex 18, a timing controller (TCON) in the electronic display 12, one or more other processing units, other processing circuitry, or any combination thereof.

The encoder circuitry 34 may be communicatively coupled to a controller 40. The controller 40 may generally control operation of the encoder circuitry 34. Although depicted as a single controller 40, in other embodiments, one or more separate controllers 40 may be used to control operation of the encoder circuitry 34. Additionally, in some embodiments, the controller 40 may be implemented in the encoder circuitry 34, for example, as a dedicated video encoding controller.

The controller 40 may include a controller processor 42 and controller memory 44. In some embodiments, the controller processor 42 may execute instructions and/or process data stored in the controller memory 44 to control operation of the encoder circuitry 34. In other embodiments, the controller processor 42 may be hardwired with instructions that control operation of the encoder circuitry 34. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

The encoder circuitry 34 includes direct memory access (DMA) circuitry 36. In some embodiments, the DMA circuitry 36 may communicatively couple the encoder circuitry 34 to an image sensor (e.g., image sensor 13) and/or external memory that stores source image data, for example, image data generated by the image sensor 13 or received via the network interface 24 or the I/O ports 16. For example, the external memory may be the memory 20 or storage devices 22.

To facilitate generating encoded image data, the encoder circuitry 34 may include multiple parallel pipelines. For example, in the depicted embodiment, the encoder circuitry 34 includes a low-resolution pipeline 46 and a main encoding pipeline 48. The main encoding pipeline 48 may encode source image data using prediction techniques (e.g., inter prediction techniques or intra prediction techniques).

To facilitate prediction encoding source image data, the main encoding pipeline 48 may perform various functions. To simplify discussion, the functions are divided between various blocks (e.g., circuitry, modules) in the main encoding pipeline 48. In the depicted embodiment, the main encoding pipeline 48 includes a motion estimation block 52, an inter prediction block 54, an intra prediction block 56, a mode decision block 58, a reconstruction block 60, and a filter block 64.

The motion estimation block 52 is communicatively coupled to the DMA circuitry 36. In this manner, the motion estimation block 52 may receive source image data via the DMA circuitry 36, which may include a luma component (e.g., Y) and two chroma components (e.g., Cr and Cb). In some embodiments, the motion estimation block 52 may process one coding tree unit (CTU), including one luma coding block and two chroma coding blocks, at a time. As used herein a "luma coding block" is intended to describe the luma component of a CTU and a "chroma coding block" is intended to describe a chroma component of a CTU.

A luma coding block may be the same resolution as the CTU. On the other hand, the chroma coding blocks may vary in resolution based on chroma sampling format. For example, using a 4:4:4 sampling format, the chroma coding blocks may be the same resolution as the CTU. However, the chroma coding blocks may be half (e.g., half resolution in the horizontal direction) the resolution of the CTU when a 4:2:2 sampling format is used and a quarter (e.g., half resolution in the horizontal direction and half resolution in the vertical direction) the resolution of the CTU when a 4:2:0 sampling format is used.

As described above, a CTU may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of the prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter prediction modes that can be used to encode a prediction unit. An inter prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter prediction mode, the motion estimation block 52 may search reconstructed luma image data, which may be previously generated by the reconstruction block 60 and stored in internal memory 53 (e.g., reference memory) of the encoder circuitry 34. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample. The values of the horizontal and vertical offsets may also be referred to as x-components and y-components, respectively.

In this manner, the motion estimation block 52 may determine candidate inter prediction modes (e.g., reference index and motion vector) for one or more prediction units in the CTU. The motion estimation block 52 may then input candidate inter prediction modes to the inter prediction block 54. Based at least in part on the candidate inter prediction modes, the inter prediction block 54 may determine luma prediction samples (e.g., predictions of a prediction unit).

The inter prediction block 54 may determine a luma prediction sample by applying motion compensation to a reference sample indicated by a candidate inter prediction mode. For example, the inter prediction block 54 may apply motion compensation by determining luma of the reference sample at fractional (e.g., quarter or half) pixel positions. The inter prediction block 54 may then input the luma prediction sample and corresponding candidate inter prediction mode to the mode decision block 58 for consideration. In some embodiments, the inter prediction block 54 may sort the candidate inter prediction modes based on associated mode cost and input only a specific number to the mode decision block 58.

The mode decision block 58 may also consider one or more candidate intra predictions modes and corresponding luma prediction samples output by the intra prediction block 56. The main encoding pipeline 48 may be capable of implementing multiple (e.g., 13, 17, 25, 29, 35, 38, or 43) different intra prediction modes to generate luma prediction samples based on adjacent pixel image data. Thus, in some embodiments, the intra prediction block 56 may determine a candidate intra prediction mode and corresponding luma prediction sample for a prediction unit based at least in part on luma of reconstructed image data for adjacent (e.g., top, top right, left, or bottom left) pixels, which may be generated by the reconstruction block 60.

For example, utilizing a vertical prediction mode, the intra prediction block 56 may set each column of a luma prediction sample equal to reconstructed luma of a pixel directly above the column. Additionally, utilizing a DC prediction mode, the intra prediction block 56 may set a luma prediction sample equal to an average of reconstructed luma of pixels adjacent the prediction sample. The intra prediction block 56 may then input candidate intra prediction modes and corresponding luma prediction samples to the mode decision block 58 for consideration. In some embodiments, the intra prediction block 56 may sort the candidate intra prediction modes based on associated mode cost and input only a specific number to the mode decision block 58.

The mode decision block 58 may determine encoding parameters to be used to encode the source image data (e.g., a CTU). In some embodiments, the encoding parameters for a CTU may include prediction technique (e.g., intra prediction techniques or inter prediction techniques) for the CTU, number of prediction units in the CTU, size of the prediction units, prediction mode (e.g., intra prediction modes or inter prediction modes) for each of the prediction units, number of transform units in the CTU, size of the transform units, whether to split the CTU into smaller CTUs, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each CTU in the image frame may be prediction encoded using intra prediction techniques.

On the other hand, in a P-frame or B-frame, source image data may be encoded by referencing image data used to display the same image frame and/or a different image frames. More specifically, in a P-frame, source image data may be encoded by referencing image data associated with a previously coded or transmitted image frame. Additionally, in a B-frame, source image data may be encoded by referencing image data used to code two previous image frames. More specifically, with a B-frame, a prediction sample may be generated based on prediction samples from two previously coded frames; the two frames may be different from one another or the same as one another. Accordingly, when the image frame is a P-frame or a B-frame, the mode decision block 58 may determine that each CTU in the image frame may be prediction encoded using either intra techniques or inter techniques.

Although using the same prediction technique, the configuration of luma prediction blocks in a CTU may vary. For example, the CTU may include a variable number of luma prediction blocks at variable locations within the CTU, which each uses a different prediction mode. As used herein, a "prediction mode configuration" is intended to describe the number, size, location, and prediction mode of luma prediction blocks in a CTU. Thus, the mode decision block 58 may determine a candidate inter prediction mode configuration using one or more of the candidate inter prediction modes received from the inter prediction block 54. Additionally, the mode decision block 58 may determine a candidate intra prediction mode configuration using one or more of the candidate intra prediction modes received from the intra prediction block 56.

Since a CTU may utilize the same prediction technique, the mode decision block 58 may determine prediction technique for the CTU by comparing rate-distortion metrics (e.g., costs) associated with the candidate prediction mode configurations and/or a skip mode. In some embodiments, the rate-distortion metric may be determined by summing a first product obtained by multiplying an estimated rate that indicates number of bits expected to be used to indicate encoding parameters and a first weighting factor for the estimated rate and a second product obtained by multiplying a distortion metric (e.g., sum of squared difference) resulting from the encoding parameters and a second weighting factor for the distortion metric. The first weighting factor may be a Lagrangian multiplier, and the first weighting factor may depend on a quantization parameter associated with image data being processed.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the reconstruction block 60. Additionally or alternatively, the distortion metric may be a sum of absolute transformed difference (SATD) between the luma coding block and reconstructed luma image data received from the reconstruction block 60.

In some embodiments, prediction residuals (e.g., differences between source image data and prediction sample) resulting in a CTU may be transformed as one or more transform units. As used herein, a "transform unit" is intended to describe a sample within a CTU that is transformed together. In some embodiments, a CTU may include a single transform unit. In other embodiments, the CTU may be divided into multiple transform units, which is each separately transformed.

Additionally, the estimated rate for an intra prediction mode configuration may include expected number of bits used to indicate intra prediction technique (e.g., CTU overhead), expected number of bits used to indicate intra prediction mode, expected number of bits used to indicate a prediction residual (e.g., source image data—prediction sample), and expected number of bits used to indicate a transform unit split. On the other hand, the estimated rate for an inter prediction mode configuration may include expected number of bits used to indicate inter prediction technique, expected number of bits used to indicate a motion vector (e.g., motion vector difference), and expected number of bits used to indicate a transform unit split. Additionally, the estimated rate of the skip mode may include number of bits expected to be used to indicate the CTU when prediction encoding is skipped.

In embodiments where the rate-distortion metric of equation (1) is used, the mode decision block 58 may select a prediction mode configuration or skip mode with the lowest associated rate-distortion metric for a CTU. In this manner, the mode decision block 58 may determine encoding parameters for a CTU, which may include prediction technique (e.g., intra prediction techniques or inter prediction techniques) for the CTU, number of prediction units in the CTU, size of the prediction units, prediction mode (e.g., intra prediction modes or inter prediction modes) for each of the prediction unit, number of transform units in the coding block, size of the transform units, whether to split the CTU into smaller CTUs, or any combination thereof.

To facilitate improving perceived image quality resulting from decoded image data, the main encoding pipeline 48 may then mirror decoding of encoded image data. To facilitate, the mode decision block 58 may output the encoding parameters and/or luma prediction samples to the reconstruction block 60. Based on the encoding parameters and reconstructed image data associated with one or more adjacent blocks of image data, the reconstruction block 60 may reconstruct image data.

More specifically, the reconstruction block 60 may generate the luma component of reconstructed image data. In some embodiments, the reconstruction block 60 may generate reconstructed luma image data by subtracting the luma prediction sample from luma of the source image data to determine a luma prediction residual. The reconstruction block 60 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The reconstruction block 60 may then add the reconstructed luma prediction residual to the luma prediction sample to determine reconstructed luma image data. As described above, the reconstructed luma image data may then be fed back for use in other blocks in the main encoding pipeline 48, for example, via storage in internal memory 53 of the main encoding pipeline 48. Additionally, the reconstructed luma image data may be output to the filter block 62.

The reconstruction block 60 may also generate both chroma components of reconstructed image data. In some embodiments, chroma reconstruction may be dependent on sampling format. For example, when luma and chroma are sampled at the same resolution (e.g., 4:4:4 sampling format), the reconstruction block 60 may utilize the same encoding parameters as used to reconstruct luma image data. In such embodiments, for each chroma component, the reconstruction block 60 may generate a chroma prediction sample by applying the prediction mode configuration determined by the mode decision block 58 to adjacent pixel image data.

The reconstruction block 60 may then subtract the chroma prediction sample from chroma of the source image data to determine a chroma prediction residual. Additionally, the reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, which may be input to the filter block 64.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decoded image data, the filter block 62 may filter the reconstructed image data (e.g., reconstructed chroma image data and/or reconstructed luma image data). In some embodiments, the filter block 62 may perform deblocking and/or sample adaptive offset (SAO) functions. For example, the filter block 62 may perform deblocking on the reconstructed image data to reduce perceivability of blocking artifacts that may be introduced.

Additionally, the filter block 62 may perform a sample adaptive offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the reconstruction block 60 (e.g., quantization coefficients), and encoding parameters used by the filter block 62. To facilitate communication, the encoding parameters may be expressed as syntax elements. For example, a first syntax element may indicate a prediction mode (e.g., inter prediction mode or intra prediction mode), a second syntax element may indicate a quantization coefficient, a third syntax element may indicate a configuration of prediction units, and a fourth syntax element may indicate a configuration of transform units.

Additionally, the encoder circuitry 34 may include the motion compensated temporal filtering circuitry 66, which may perform further motion vector refinement operations and perform temporal filtering operations on the refined motion vectors received from the main encoding pipeline 48 and the low-resolution pipeline 46. The motion compensated temporal filtering circuitry 66 may receive motion vectors from the main encoding pipeline 48, the low-resolution pipeline 46, or both, and may fetch source pixels and reference pixels based on the received motion vectors. Additionally, the motion compensated temporal filter block 66 may perform motion vector refinement based on the received motion vectors and fetched source pixels and reference pixels. The motion compensated temporal filter block 66 may use the refined motion vectors to perform temporal filtering operations by calculating a weighted average of the source and reference pixels to determine filtered pixel values for the video image data, and transmit the filtered encoded image data to the output for transmission, storage, and/or display.

Additionally, the encoder circuitry 34 may be communicatively coupled to an output. In this manner, the encoder circuitry 34 may output encoded (e.g., compressed) image data to such an output, for example, for storage and/or transmission. Thus, in some embodiments, the local memory 20, the main memory storage device 22, the network interface 24, the I/O ports 16, the controller memory 44, or any combination thereof may serve as an output.

As described above, the duration provided for encoding image data may be limited, particularly to enable real-time or near real-time display and/or transmission. To improve operational efficiency (e.g., operating duration and/or power consumption) of the main encoding pipeline 48, the low-resolution pipeline 46 may include a scaler block 65 and a low-resolution motion estimation (ME) block 68. The scaler block 65 may receive image data and downscale the image data (e.g., a CTU) to generate low-resolution image data. For example, the scaler block 65 may downscale a 32×32 CTU to one-sixteenth resolution to generate an 8×8 downscaled CTU. In other embodiments, such as embodiments in which pre-processing circuitry generates image data (e.g., low-resolution image data) from source image data, the low-resolution pipeline may not include the scaler block 65, or the scaler block 65 may not be utilized to downscale image data.

The low-resolution motion estimation block 63 may improve operational efficiency by initializing the motion estimation block 52 with candidate inter prediction modes, which may facilitate reducing searches performed by the motion estimation block 52. Additionally, the low-resolution motion estimation block 63 may improve operational efficiency by generating global motion statistics that may be utilized by the motion estimation block 52 to determine a global motion vector.

Figure 7:
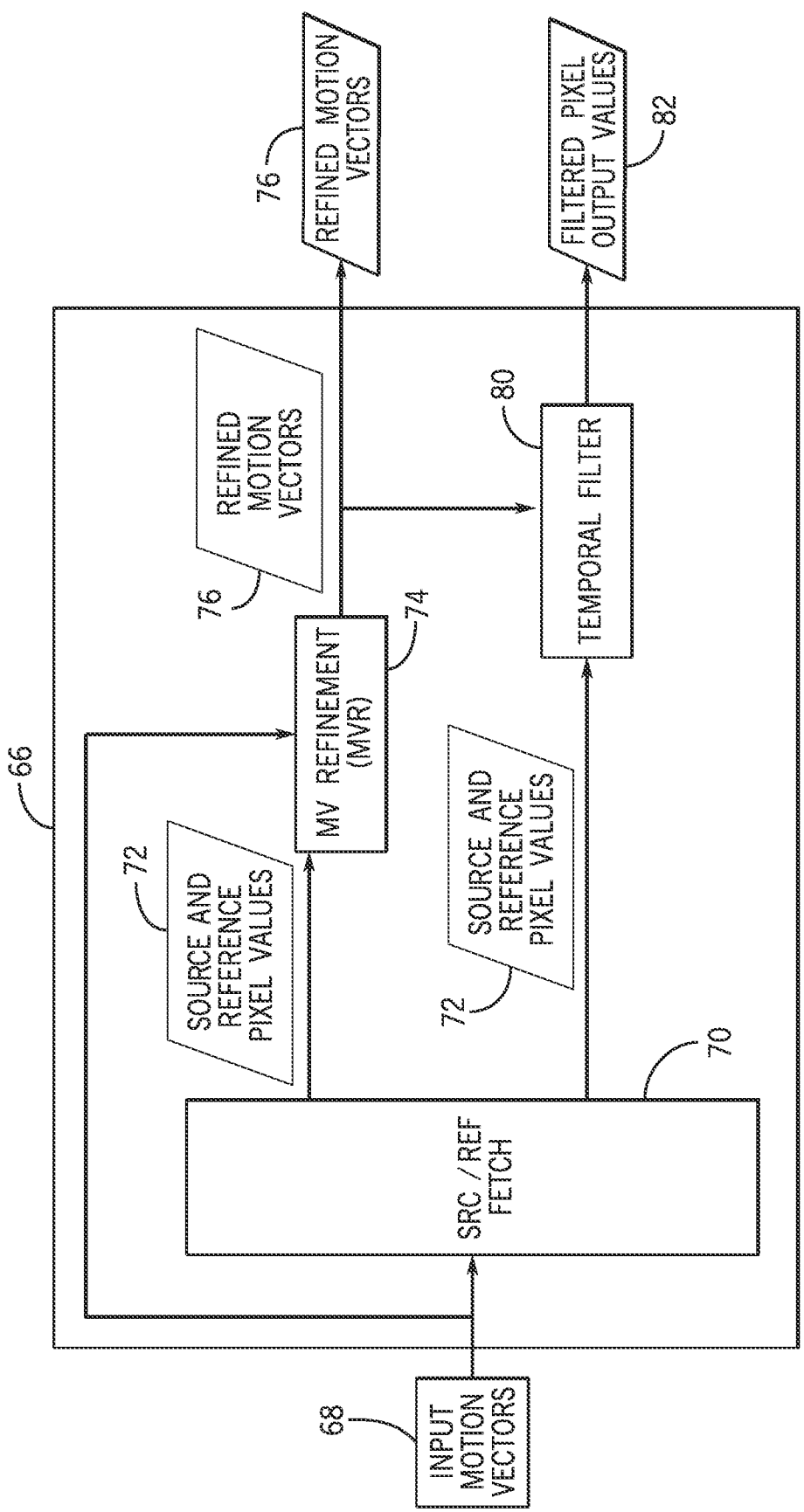
FIG. 7 is block diagram of motion compensated temporal filtering circuitry of the video encoding system of FIG. 6, in accordance with an embodiment.

To help elaborate on performing motion compensated temporal filtering, the motion compensated temporal filtering circuitry 66 is shown in FIG. 7. The motion compensated temporal filtering circuitry 66 may receive input motion vectors 68 that include motion vectors produced during main encoding pipeline operations 48 and the low-resolution pipeline 46. The input motion vectors 68 may be used by a source and reference fetch block 70 to determine source pixel values and reference pixel values corresponding to the input motion vectors 68. Source and reference pixel values 72 determined by the source and reference fetch block 70 may be sent to a motion vector refinement block 74 and used to refine motion vectors. A temporal filter block 80 may receive the refined motion vectors 76 from the motion vector refinement block 74 along with the source and reference pixel values 72. The temporal filter 80 may then filter the source and reference pixel values 72 (e.g., based on or using the refined motion vectors 76) to produce filtered pixel output values 82. The motion compensated temporal filtering circuitry 66 may output the refined motion vectors 76 and the filtered pixel output values 82.

As discussed above, the source and reference fetch block 70 receives input motion vectors 68. The input motion vectors 68 may be received from the DMA circuitry 38, the main encoding pipeline 48, the low-resolution pipeline 46, or any other component of the electronic device 10. The source and reference fetch block 70 includes hardware that determines source and reference pixels based on the input motion vectors 68. The source and reference pixels may be utilized during motion vector refinement block 74 and the temporal filter block 80 operations. The source and reference fetch block 70 may fetch the source pixels corresponding to the current CTU of the input motion vectors 68. The CTU may be 32×32 pixels and include 16×16 block of Chroma pixels per component. The source and reference fetch block 70 may also fetch source pixels outside the CTU. This may include an additional row of pixels (e.g., additional 33 pixels) and a column of luma pixels (e.g., 32 luma pixels) that may be above the current CTU. This may determine the 33×33 source luma block that will be used in later motion vector refinement and temporal filtering operations. Additionally, for each chroma component determined by the search and reference fetch block 70, an additional row and column of chroma pixels may be used above and to the left of the CTU. This may result in a block of pixels (e.g., a 17×17 block) that is up-sampled from the CTU block of pixels (e.g., a 34×34 block).

The search and reference fetch block 70 may use the motion vectors to determine the exact location of the reference chroma pixels (e.g., 4×4 block) to be fetched that correspond to the luma pixel block. The fetched chroma pixels full-pel position may be off by a half-pel distance relative to the fetched luma full-pel position. The refined chroma pixels may be a distance away from both an even and/or odd motion vector in the center of the fetched chroma full-pel position. The maximum distance from chroma full-pel position may be −1.25 to 1.75 pixels, or any suitable maximum distance for use in temporal filtering. The reference chroma pixel may be fetched in 8×8 blocks at a time including surrounding 2 pixels on all four sides of the 8×8 blocks, or based on any suitable chroma block size. Additionally, the motion vectors may be used to determine blocks to be fetched for the reference luma pixels. The reference luma pixels are fetched in certain number of blocks at a time, including the additional surrounding pixels. The blocks selected by the refined motion vector may be at the center of the CTU block.

The source pixels and reference pixels 72 may be sent to the motion vector refinement block 74. The motion vector refinement block 74 up samples the luma pixels with bilinear interpolation, such that the reference frame corresponds to a smaller block size (e.g., a 28×28 block). In the case of a block located on the frame boundary, the nearest boundary pixels may be repeated to fill out boundary values within the block.

The motion vector refinement block 74 determines the current best motion vector from the received motion vectors 68 and refines the motion vector around a size window (e.g., ±1.5) for sub-pel precision. The refinement of the received motion vectors 68 may be completed in 8×8 pixel blocks. The motion vector refinement block may consider a certain number of motion vectors based on the source pixel block size. For example, an 8×8 source pixel block corresponds to forty-nine motion vectors for consideration. To complete the sub-pel refinement for each of the 8×8 blocks, bilinear interpolation is completed using the source and reference pixel blocks. The cost for each motion vector may be determined based on the smoothness of the motion vector compared to or relative to surrounding motion vectors, and the difference between the luma source and reference pixels (e.g., a sum of absolute difference (SAD)). The resulting motion vectors are determined to be refined motion vectors 76 by the motion vector refinement block 74.

The temporal filter block 80 receives the refined motion vectors 76, and filters each source pixel along with the corresponding reference pixels determined by the refined motion vectors 76. The filtering may be carried out on a pixel-by-pixel basis. For example, the temporal filter block 80 may utilize lookup tables (LUTs) to replace the inverse computations for pixel difference, motion vector difference, and infinite image response (IIR) weight. The pixel weight and motion vector weight (e.g., 0-4) for each LUT may be set for each reference image frame. The temporal filtering block 80 may perform a filtering operation by calculating a weighted combination of the source pixels and reference pixels. The weight may be determined by multiplying together different weights to get the final weight. For example, the weights that are multiplied together may be a pixel weight determined per pixel, a motion weight per pixel block, and an IIR weight per pixel block. In other embodiments, block-based weights may be derived by the motion vector refinement block 74, and may be sent to the temporal filter block 80. The filtered pixel values output 82 and the refined motion vectors 76 may be output and sent to the DMA, image display circuitry, or sent back into the motion compensation temporal filtering circuitry 66 to be used as neighbor reference values.

Figure 8:
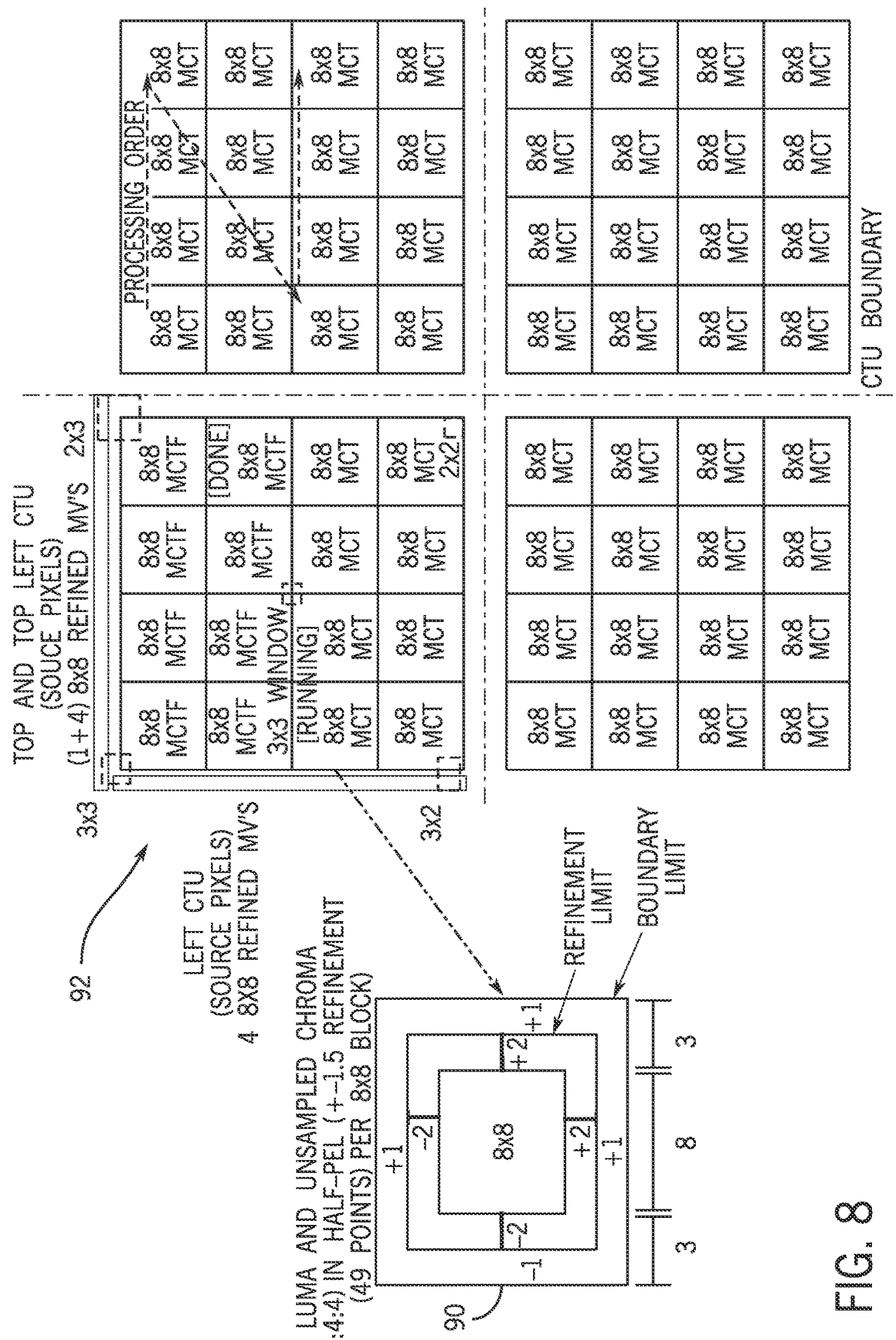
FIG. 8 is a diagrammatic representation of motion vector refinement completed via the motion compensated temporal filtering circuitry of FIG. 7, in accordance with an embodiment.

Keeping the foregoing in mind, FIG. 8 is a diagrammatic representation of motion vector refinement of received motion vectors, in accordance with an embodiment. The motion vector refinement block 74 may refine received motion vectors using corresponding source and reference pixel values received from the source and reference fetch block 70. The motion vector refinement block 74 may refine a received motion vectors 76 of the source pixel block 92 around a specified window (e.g., ±1.5) in sub-pel precision. The refinement may include selecting the lowest cost motion vector out of considered motion vectors for each of the 8×8 source pixel blocks. The cost may be calculated by using bilinear interpolation and determining differences between source and reference pixel values.

The motion vector refinement block 74 may refine the motion vectors in the source pixel blocks 92 (e.g., 8×8 pixel blocks, 16×16 pixel blocks, 32×32 pixel blocks). For each source pixel block 90 a total number of motion vectors relative to the block size may be considered. To perform the sub-pel refinement of the motion vectors of each 8×8 block 90, bilinear interpolation may be completed on the source pixel blocks. The cost for each of the candidate motion vectors may be determined based on determining the difference between the source pixels and reference pixels for each of the source pixel blocks. Each of the source pixel blocks 90 may include luma pixel values and up-sampled chroma pixel values in half-pel precision (e.g., forty-nine points per 8×8 block). The motion vector refinement network may include multiple source pixel blocks that include multiple CTU source pixel units 92. The cost of each source pixel block 90 is computed by determining the difference between the source pixel values and reference pixel values is computed. Additionally, the cost computation may include determining a lambda motion vector term that may be an unsigned fixed-point multiplier that balances the distortion within the source pixel block with a penalty motion vector term. The penalty motion vector term may measure the smoothness of the current motion vector under consideration relative to the neighboring motion vectors.

Figure 9:
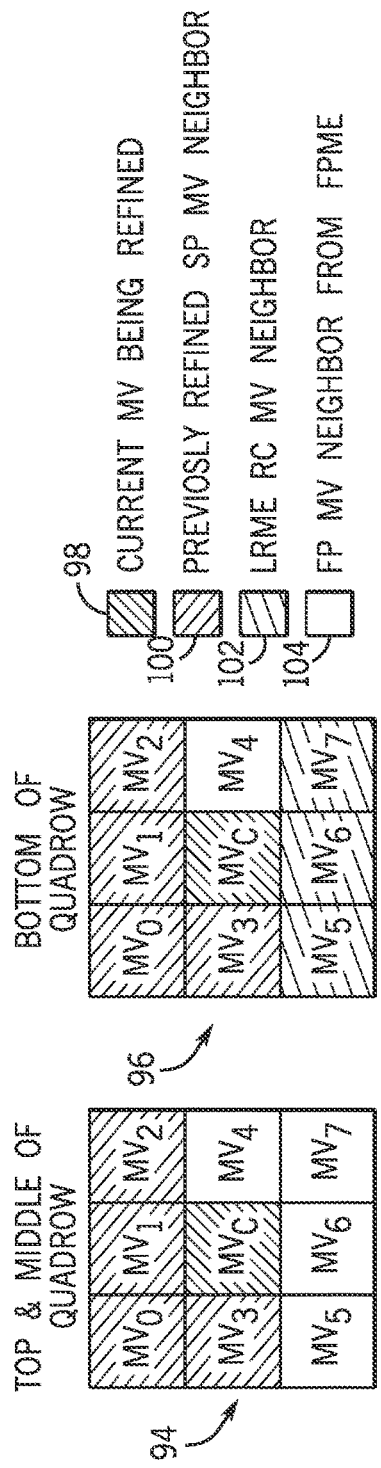
FIG. 9 is diagrammatic representation of motion vector refinement using motion vector neighbor values, in accordance with an embodiment.

With the foregoing in mind, FIG. 9 is diagrammatic representation of motion vector refinement using motion vector neighbor blocks. As discussed above, the motion vector refinement may include computing a cost of each candidate motion vector. The cost computation may include a penalty component that enables evaluation of a candidate vector relative to the neighboring motion vectors. For example, the top and middle of the pixel block quadrow 94 may include a current motion vector 98, along with previously refined motion vectors 100 neighboring the current motion vector 98, and full-pipeline motion estimation vectors 102 neighboring the current motion vector 98.

The bottom of the quadrow 96 of the pixel block may include the current motion vector 98 that is being refined, along with the previously refined motion vectors 100 neighboring the current motion vector, the full-pipeline motion estimation vectors 102 neighboring the current motion vector 98, and low-resolution pipeline motion estimation vectors 104. For each of the candidate current motion vector 98 there may be eight neighbor vectors that may be represented as $MV_i$, where i=0, . . . , 7. The analysis may use the most recently defined motion vector if available when analyzing the current motion vector 98 and determining a penalty calculation for the cost computation. If no recently defined motion vector is available, the previously refined motion vectors 100, the full-pipeline motion vectors 102, and the low-resolution motion vectors 104 should be utilized for the penalty calculation in the prior referenced order.

Figure 10:
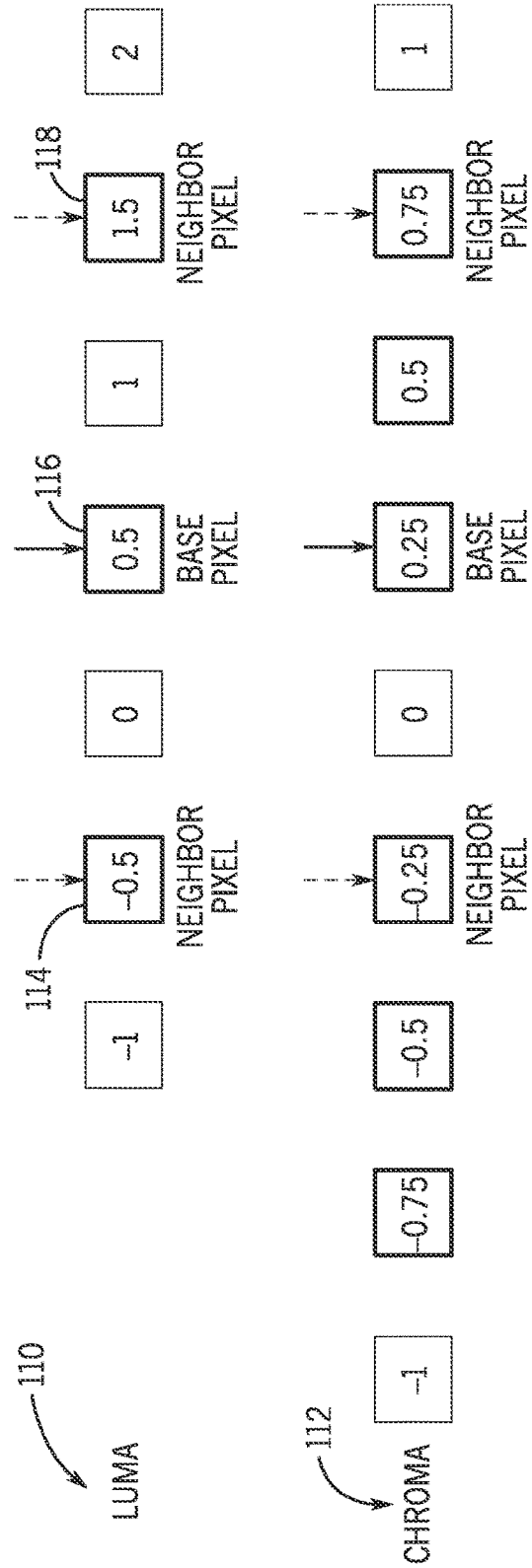
FIG. 10 is a diagrammatic representation of luma pixel value and chroma pixel value calculations for temporal filtering of pixel values, in accordance with an embodiment.

After computing the cost, the motion vector that results in the lowest cost is selected as the refined motion vector to be used in the temporal filter block 80. The temporal filter block 80 may utilize the refined motion vectors 76 along with the source and reference pixel values 72 to filter the source pixel values. For example, FIG. 10 is a diagrammatic representation of luma pixel value 110 and chroma pixel value calculations 112 for temporal filtering of pixel values, in accordance with an embodiment. The temporal filter block 80 filters each of the source pixels and the corresponding reference pixels based on the refined motion vectors.

The input data received at the temporal filter block 80 may include the luma pixels 110 and the chroma pixels 112 fetched by the source and reference fetch block 70, block values corresponding to the refined motion vectors, and averaged pixel data from source and reference frames used in the motion vector refinement of FIG. 8. The pixels, including luma and chroma values, may be contained within a 3×3 window. The luma pixel 110 values within the 3×3 window may be full-pel distance from the base pixel value 116. Further, the chroma pixel 112 values may be a half-pel distance from the base pixels 116. The pixels displayed may include luma 110 and chroma pixel 112 values. The base pixel 116 and neighbor pixels 114 may be bilinear interpolated pixels with two adjacent full-pel pixels, in the case of the luma pixels 110. The resulting input pixel values may be filtered, by performing a weighted combination of the source pixels and reference pixels. The output filtered pixels may be used to display video images that include temporal filtering for motion trajectories.

Figure 11:
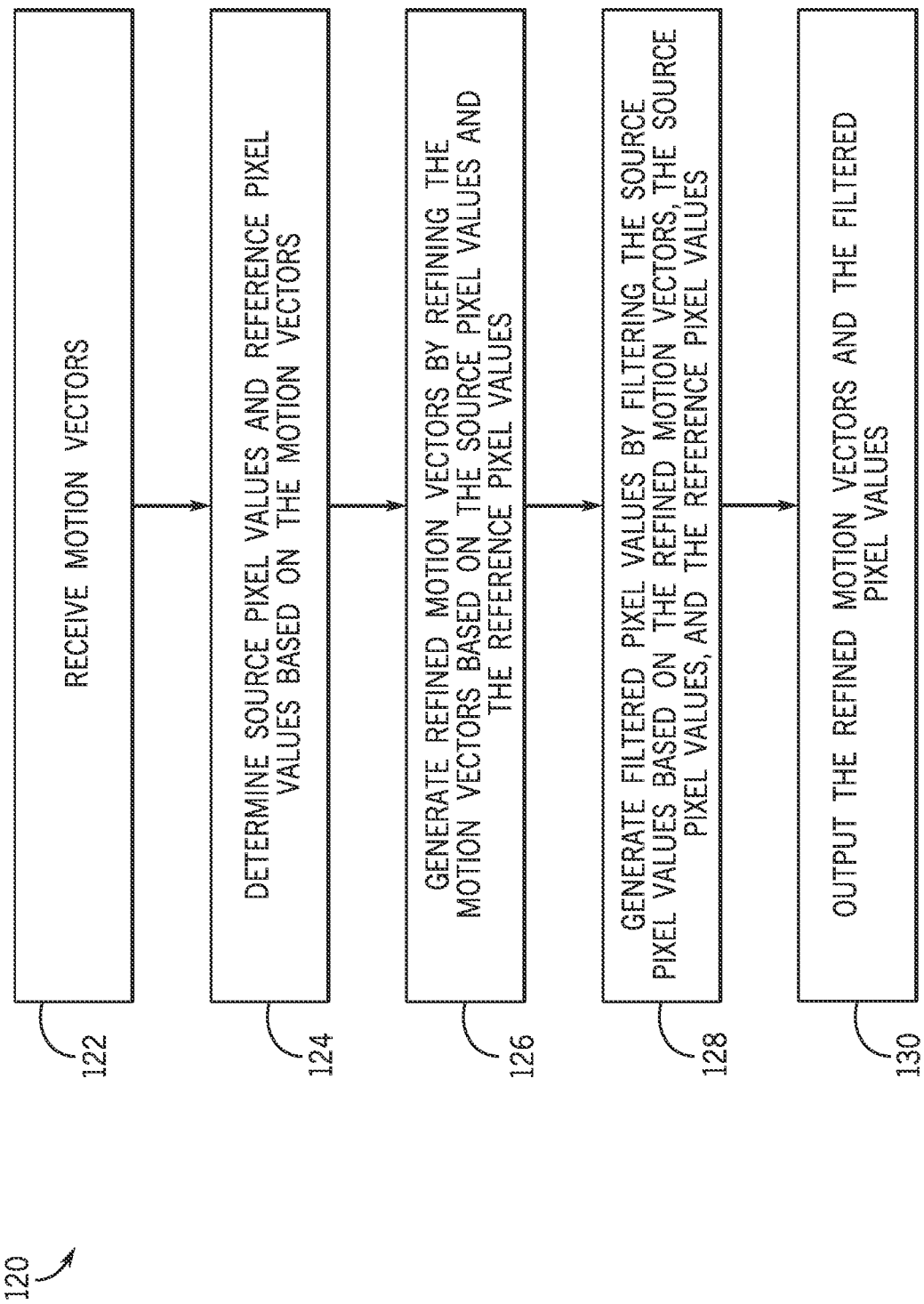
FIG. 11 is a flow diagram of a process of motion compensated temporal filtering, in accordance with an embodiment.

With the foregoing in mind, FIG. 11 is a flow diagram of a process 120 of motion compensated temporal filtering operations, in accordance with an embodiment. The motion compensated temporal filtering circuitry 66 may operate to receive motion vectors from the full-resolution pipeline 48 and the low-resolution pipeline 46, and refine the motion vectors and apply temporal filtering along motion trajectories. The motion compensated temporal filtering circuitry 66 may refine the received motion vectors 68, and may utilize the received motion vectors 68 to filter the source pixels to produce final output pixels that include temporal filtering based on the refined motion vectors.

The motion compensated temporal filtering circuitry 66, at process block 122, receives motion vectors 68 from the low-resolution pipeline 46 and the full-resolution pipeline 48 of encoder circuitry 34. The received motion vectors 68 may be received at the source and reference fetch block 70, along with the motion vector refinement block 74. The motion compensated temporal filtering circuitry 66, at process block 124, determines source pixel values and reference pixel values 72 based on the received motion vectors 68. For instance, referring briefly to FIG. 7, as discussed above, the motion compensated temporal filtering circuitry 66 may include source and reference fetch block 70 that fetches the corresponding source and reference pixel values 72 based on the received motion vectors 68. The source and reference fetch block 70 may send the fetched source pixels and reference pixel values 72 to the motion vector refinement block 74 along with the temporal filter block 80. The source pixels and reference pixel values 72 are used to facilitate refinement of the motion vectors, along with the filter coefficient calculation based on the window around each of the filtered pixels.

Returning to FIG. 11 and the discussion of the process 120, the motion compensated temporal filtering circuitry 66, at process block 126, generates the refined motion vectors 76 by refining the received motion vectors 68 based on the fetched source pixel values and the reference pixel values 72. The motion compensated temporal filtering circuitry 66 may include motion vector refinement block 74 that may select the best received motion vectors 68 and refine the motion vectors around a specified window in sub-pel resolution. The refinement may take place in certain pixel size block units. The refined motion vectors may then be sent to temporal filtering circuitry.

The motion compensated temporal filtering circuitry 66, at process block 128, generates the filtered pixel values output 82 by filtering the source pixel values based on the refined motion vectors, source pixel values, and the reference pixel values. More specifically, the temporal filter block 80 may perform filtering operations using the corresponding reference pixel blocks from all active reference frames in filtering the source pixel block. At process block 130, the motion compensated temporal filtering circuitry 66 outputs the refined motion vectors 76 and the filtered pixel values output 82. The final output may be the filtered pixel values output 82 and the refined motion vectors 75 of all the active reference pixel values.

Figure 12:
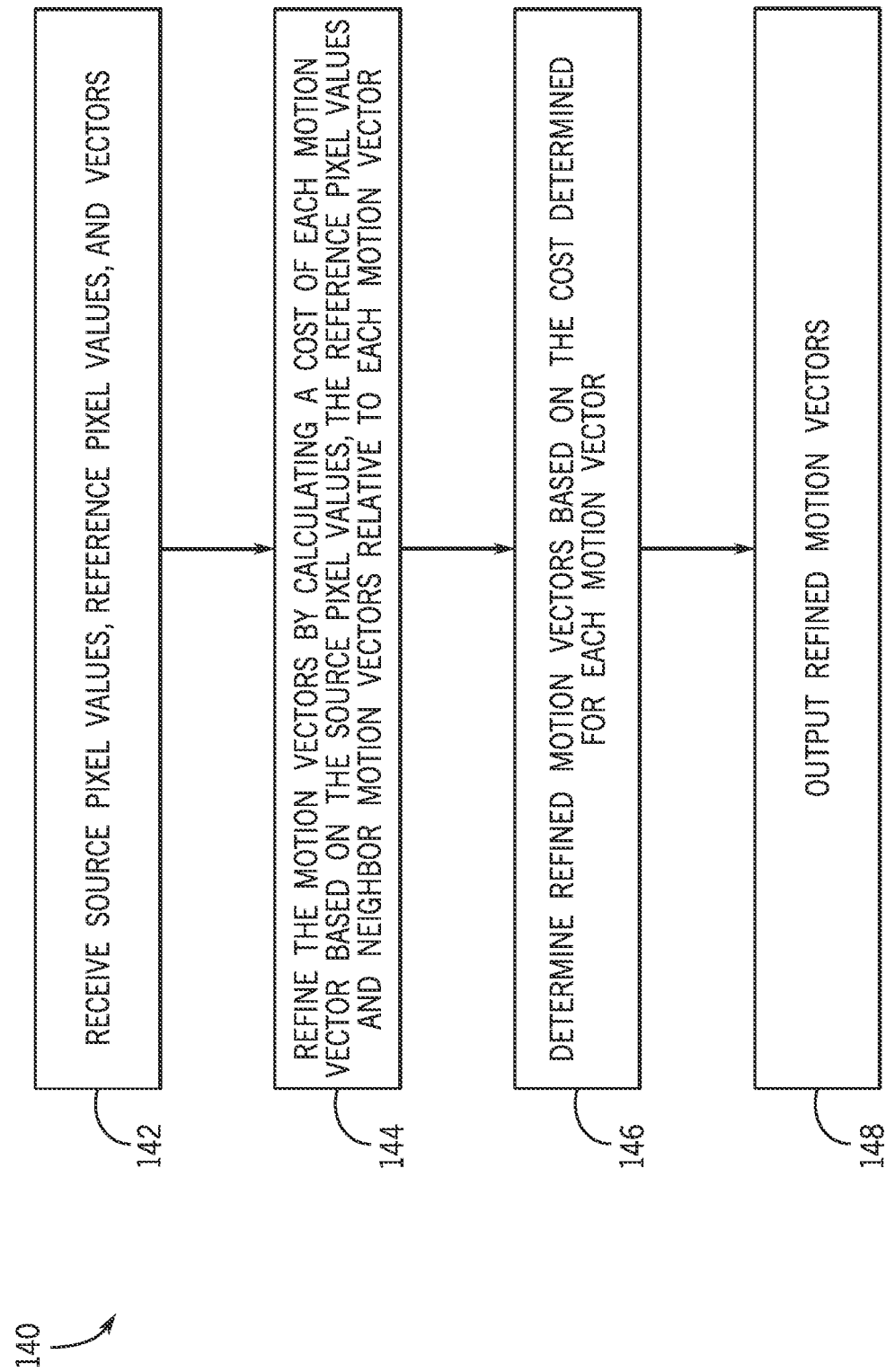
FIG. 12 is a flow diagram of a process for refining motion vectors, in accordance with an embodiment.

With the foregoing in mind, FIG. 12 is a flow diagram of a process 140 of motion vector refinement operations, in accordance with an embodiment. The process 140 may be performed by the motion vector refinement block 74 that receives the motion vectors from the full-resolution pipeline 48 and the low-resolution pipeline 46 of the encoder circuitry 34. Additionally, the motion vector refinement block 74 receives the source pixels and reference pixel values 72 from the source and reference fetch block 70. The motion vector refinement block 74 may refine the best candidate motion vectors around a specific window in sub-pel precision. Accordingly, the process 140 may be performed at process block 126 of the process 120.

The motion vector refinement block 74, at process block 142, receives the source pixel values, and the reference pixel values 72, and the input motion vectors 68. As discussed above, the motion vector refinement block 74 receives the input motion vectors 68 from the full-resolution pipeline 48 and the low-resolution pipeline 46 of the encoder circuitry 34. Additionally, the motion vector refinement block 74 receives the source pixels and reference pixel values 72 from the source and reference fetch block 70.

The motion vector refinement block 74, at process block 144, may refine the input motion vectors 68 by calculating a cost of each motion vector based on the source pixel values, the reference pixel values 72, and the neighbor motion vectors relative to each motion vector. The motion vector refinement block 74 may up-sample the reference luma pixels with bilinear interpolation. Additionally, the motion vector refinement block 74 may select a current best candidate motion vector from the full-pipeline motion vectors and refine the best candidate motion vector around a certain window size (e.g., ±1.5) in sub-pel precision. The refinement of the full-resolution pipeline motion vectors may be carried out in pixel blocks. For example, the pixel blocks may be 8×8 pixel blocks, 16×16 pixel blocks, 32×32 pixel blocks, or any suitable pixel block size. For each source pixel block, a certain number of motion vectors are considered. For example, an 8×8 source pixel block may include forty-nine motion vectors that are considered. When considering the best candidate motion vector from the motion vectors, the cost per each motion vector may be evaluated. The luma difference between the source pixel blocks and the reference blocks may be calculated, along with a penalty motion vector value that measures the smoothness of the motion vector that is evaluated relative to its neighboring motion vectors. There may be eight neighbor motion vectors in the example of the 8×8 source pixel block.

The most recently refined motion vector may be used for the penalty calculation if available. If the most recently refined motion vector is not available, the full-resolution pipeline motion vector should be used, followed by the low-resolution motion vector. Additionally, if the CTU is on a frame boundary, some of the neighboring blocks may not be available. In this case, the unavailable neighbors are replaced by the nearest available neighbor block by extension and/or duplication. The motion vector refinement block 74, at process block 146, may determine the refined motion vectors 76 based on the cost determined for each motion vector. For example, for each 8×8 source pixel block, a cost per each candidate motion vector may be calculated, and the motion vector that results in the lowest cost may be chosen as the final refined motion vector 76. In some cases, the cost may be the same between motion vectors and the motion vector with the smallest length may be chosen as the refined motion vector. If there is a tie in cost of the motion vectors and length of the motion vectors, the order of the refinement vectors may be raster order, and the motion vector that is sorted first is selected as the refined motion vector. The motion vector refinement block 74, at block 148, outputs the refined motion vectors 76 (e.g., for an entire pixel block or a portion thereof). Additionally, the refined motion vectors 76 may be received by the temporal filter block 80.

Figure 13:
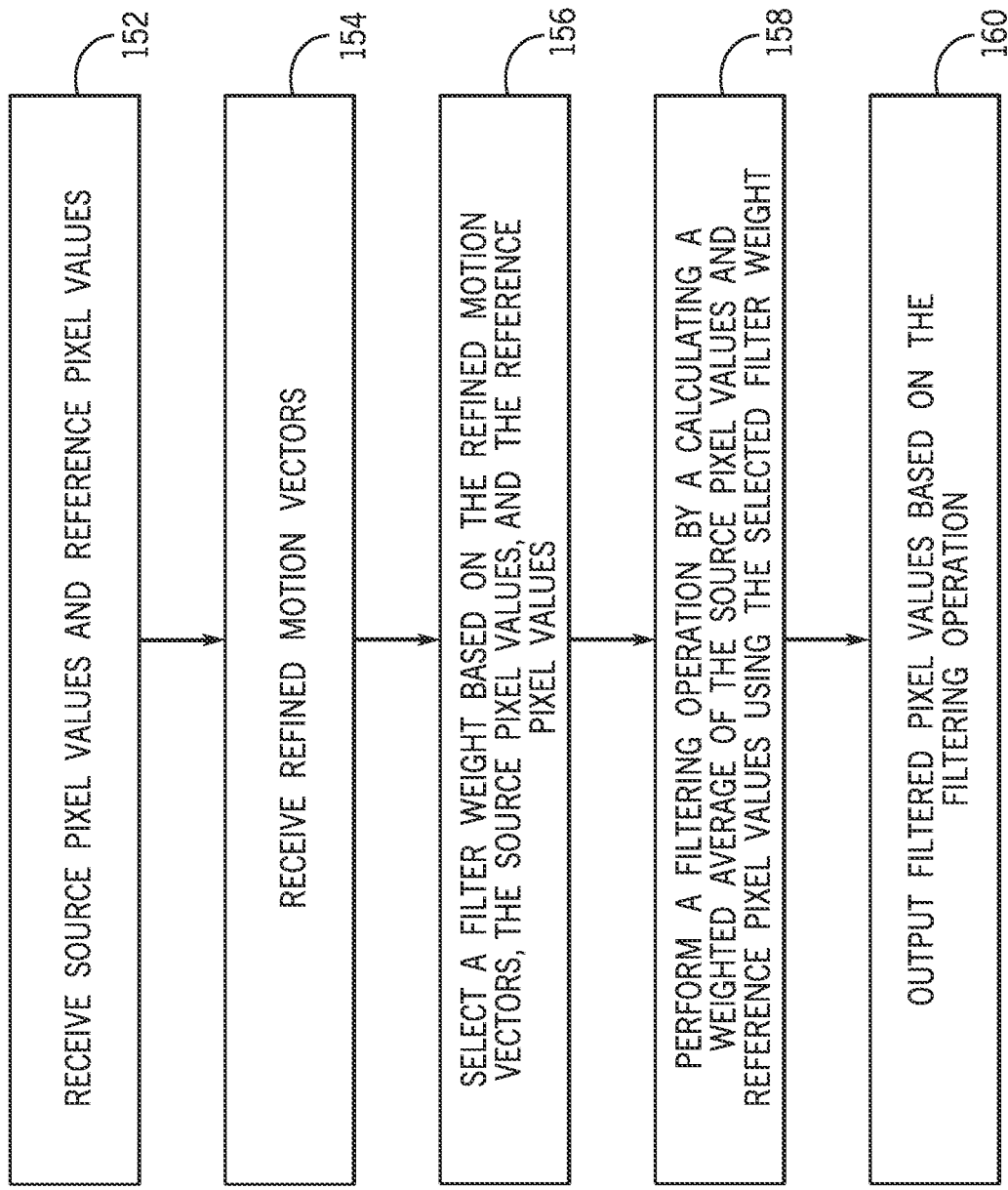
FIG. 13 is a flow diagram of process for temporal filtering, in accordance with an embodiment.

With the foregoing in mind, FIG. 13 is a flow diagram of a process 150 for performing temporal filtering. The temporal filter block 80 may filter each source pixel value with the corresponding reference pixel values determined by the refined motion vectors 76. Accordingly, the temporal filter block 80 may perform the process 150. Additionally, the process 150 may be performed at process block 128 of the process 120.

At process block 142, the temporal filter block 80 receives source pixel values and reference pixel values from the source and reference fetch block 70. The temporal filter block 80, at block 154, receives the refined motion vectors 76 output from the motion vector refinement block 74. The input data needed for each 8×8 source pixel block may include the 8×8 luma pixel block corresponding to the lowest cost determined during motion vector refinement. Additionally, the averaged motion vector of nine 8×8 blocks in a 3×3 window centered on the current block. The neighbor motion vectors within the block may be the same as the ones used during the motion vector refinement and the centered motion vector is the refined motion vector determined during motion vector refinement. The input data per pixel may include the averaged pixel values from the source and reference frames in the 3×3 window.

The temporal filter block 80, at block 156, selects a filter weight based on the refined motion vectors, the source pixel values, and the reference pixel values. The temporal filter block 80 may use look-up-tables (LUTs) to replace the inverse computations for pixel difference, motion difference, and IIR weight. The temporal filter block 80, at block 158, performs a filtering operation by calculating the weighted average of the source pixel values and reference pixel values using the selected filter weight. The filtering operation may be a weighted combination of the source pixels and the reference pixels. There may be three weights that are multiplied to compute the final weight including the pixel weight, the motion weight, and the IIR weight. In some embodiments, block-based weights may be derived using the motion vector refinement block 74 that may be sent to the temporal filter block 80. The output of the filtered pixel values output 82 may be used to display the video image and/or store in the memory.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. For example, it should be understood that while the present disclosure describes performing motion compensated temporal filtering operations and motion vector refinement operations hardware components, in other embodiments, such operations may be performed by software instructions that are executed by processing circuitry.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A video encoding system configured to encode source image data corresponding with an image, comprising:
 a low-resolution encoding pipeline and a full-resolution encoding pipeline configured to generate a plurality of motion vectors; and
 motion compensated temporal filtering circuitry configured to:
  receive the plurality of motion vectors from the low-resolution encoding pipeline and the full-resolution encoding pipeline;
  determine a plurality of source pixel values and a plurality of reference pixel values based on the plurality of motion vectors;
  generate a plurality of refined motion vectors by refining the plurality of motion vectors based at least in part on the plurality of source pixel values and reference pixel values and low-resolution motion vectors;
  generate a plurality of filtered pixel values by filtering the plurality of source pixel values based on determining a weighted combination of the plurality of the reference pixel values and the plurality of source pixel values, wherein the weighted combination comprises a weight value determined based on multiplying a pixel weight by a motion vector weight and a frame weight; and
  output the plurality of refined motion vectors and the plurality of filtered pixel values.

2. The video encoding system of claim 1, wherein the video encoding system is configured to direct the plurality of refined motion vectors and the plurality of filtered pixel values output by the motion compensated temporal filtering circuitry to the motion compensated temporal filtering circuitry to represent neighbor motion vectors in refinement operations.

3. The video encoding system of claim 1, comprising display circuitry configured to receive the plurality of refined motion vectors and the plurality of filtered pixel values output by the motion compensated temporal filtering circuitry.

4. The video encoding system of claim 1, wherein the motion compensated temporal filtering circuitry is configured to refine the plurality of motion vectors at least partially by determining a cost for each of the plurality of motion vectors.

5. The video encoding system of claim 4, wherein the motion compensated temporal filtering circuitry is configured to refine the plurality of motion vectors by:
determining a best candidate motion vector of the plurality of motion vectors based on the determined cost; and
refining the best candidate motion vector around a window size value in sub-pel resolution.

6. The video encoding system of claim 4, wherein the motion compensated temporal filtering circuitry is configured to determine the cost by calculating a difference between the plurality of source pixels and the plurality of reference pixels.

7. The video encoding system of claim 4, wherein the motion compensated temporal filtering circuitry is configured to determine the cost by calculating a penalty term that is representative of a smoothness of a current candidate motion vector relative to one or more surrounding motion vectors.

8. The video encoding system of claim 1, wherein the plurality of motion vectors is divided by source pixel blocks and refined within an increment value.

9. The video encoding system of claim 1, wherein the weighted combination comprises a weight value determined based on a difference between each of the plurality of source pixels and the plurality of reference pixels.

10. The video encoding system of claim 1, wherein the motion compensated temporal filtering circuitry comprises:
a source and reference fetch block configured to determine and obtain the plurality of source pixel values and the plurality of reference pixel values;
a motion vector refinement block configured to refine the plurality of motion vectors; and
a temporal filter block configured to generate the plurality of filtered pixel values.

11. A method comprising:
generating, via a low-resolution encoding pipeline and a full-resolution encoding pipeline, a plurality of motion vectors;
determining, via motion compensated temporal filtering circuitry, a plurality of source pixel values and a plurality of reference pixel values based on the plurality of motion vectors;
generating, via the motion compensated temporal filtering circuitry, a plurality of refined motion vectors by refining the plurality of motion vectors based at least in part on the plurality of source pixel values and reference pixel values and low-resolution motion vectors;
generating, via the motion compensated temporal filtering circuitry, a plurality of filtered pixel values by filtering the plurality of source pixel values based on determining a weighted combination of the plurality of the reference pixel values and the plurality of source pixel values, wherein the weighted combination comprises a weight value determined based on multiplying a pixel weigh by a motion vector weight and a frame weight; and
outputting, via the motion compensated temporal filtering circuitry, the plurality of refined motion vectors and the plurality of filtered pixel values.

12. The method of claim 11, comprising using the refined motion vectors as neighbor motion vectors in refinement operations.

13. The method of claim 11, comprising sending the plurality of refined motion vectors and the plurality of filtered pixel values to display circuitry.

14. The method of claim 11, wherein refining the plurality of motion vectors based on the plurality of source pixel values and reference pixel values comprises computing a cost for each of the plurality of motion vectors.

15. The method of claim 14, wherein refining the plurality of motion vectors based on the plurality of source pixel values and reference pixel values comprises:
determining a best candidate motion vector of the plurality of motion vectors based on the computed cost; and
refining the best candidate motion vector around a window size value in sub-pel resolution.

16. An electronic device comprising:
a display; and
a video encoding system configured to encode source image data corresponding with an image, the video encoding system comprising:
a low-resolution encoding pipeline and a full-resolution encoding pipeline configured to generate a plurality of motion vectors; and
motion compensated temporal filtering circuitry configured to:
receive the plurality of motion vectors from the low-resolution encoding pipeline and the full-resolution encoding pipeline;
determine a plurality of source pixel values and a plurality of reference pixel values based on the plurality of motion vectors;
generate a plurality of refined motion vectors by refining the plurality of motion vectors based at least in part on the plurality of source pixel values and reference pixel values and low-resolution motion vectors;
generate a plurality of filtered pixel values by filtering the plurality of source pixel values based on determining a weighted combination of the plurality of the reference pixel values and the plurality of source pixel values, wherein the weighted combination comprises a weight value determined based on multiplying a pixel weight by a motion vector weight and a frame weight; and
output the plurality of refined motion vectors and the plurality of filtered pixel values.

17. The electronic device of claim 16, wherein the display is configured to receive the plurality of refined motion vectors and the plurality of filtered pixel values output by the motion compensated temporal filtering circuitry.

18. The video encoding system of claim 1, wherein refining the plurality of motion vectors is also based at least in part on previously refined motion vectors and full resolution motion vectors.

19. The video encoding system of claim 1, wherein filtering the plurality of source pixel values is performed on a pixel-by-pixel basis.

20. The video encoding system of claim 1, wherein the pixel weight and the motion vector weight are each associated with a lookup table.

* * * * *